United States Patent
Luo et al.

(10) Patent No.: US 7,498,694 B2
(45) Date of Patent: Mar. 3, 2009

(54) POWER MANAGEMENT SYSTEM WITH MULTIPLE POWER SOURCES

(75) Inventors: Luyang Luo, Sichuan (CN); Chun Lu, San Jose, CA (US); Jianping Xu, Sichuan (CN); Lin Tang, Sichuan (CN)

(73) Assignee: 02Micro International Ltd., Georgetown (KY)

( * ) Notice: Subject to any disclaimer, the term of this patent is extended or adjusted under 35 U.S.C. 154(b) by 222 days.

(21) Appl. No.: 11/402,387

(22) Filed: Apr. 12, 2006

(65) Prior Publication Data
US 2007/0241732 A1    Oct. 18, 2007

(51) Int. Cl.
*H02J 3/00* (2006.01)
(52) U.S. Cl. .................... 307/82; 307/43; 323/282; 323/205
(58) Field of Classification Search .......... 307/573, 307/355, 243, 87, 66, 356, 357, 43, 44, 52, 307/53, 58, 82, 105; 323/282–288, 272, 323/273, 222; 363/59, 60, 61, 72, 86, 89, 363/97, 21.04, 21.11
See application file for complete search history.

(56) References Cited

U.S. PATENT DOCUMENTS

| | | | | |
|---|---|---|---|---|
| 5,157,291 A | * | 10/1992 | Shimoda | 327/408 |
| 5,912,552 A | * | 6/1999 | Tateishi | 323/285 |
| 7,256,568 B2 | * | 8/2007 | Lam et al. | 323/222 |

* cited by examiner

*Primary Examiner*—Rajnikant B Patel
(74) *Attorney, Agent, or Firm*—Wang Law Firm, Inc.; Li Kan Wang

(57) ABSTRACT

A power management device for enabling multiply power sources to supply power to a load. The power management device includes a plurality of switches and a control logic. The plurality of switches are coupled to a plurality of power sources respectively and each switch coupled to each power source. The control logic is capable of selecting a set of switches among the plurality of switches to cooperate in a time-divided fashion to allow the power sources to provide power to the load. The set of switches is selected based on an electrical requirement of the load and an electrical condition of each switch.

19 Claims, 9 Drawing Sheets

POWER MANAGEMENT SYSTEM WITH MULTIPLE POWER SOURCES

FIELD OF THE INVENTION

The invention relates to power management and, more specifically, to a power management system with multiple power sources.

BACKGROUND OF THE INVENTION

Usually, an electronic device or, more specifically, a portable electronic device such as a portable media player (PMP), a portable media center (PMC), a MP4 player, a personal digital assistant, a cell phone, a digital camera, etc. may be powered by more than one power sources. Multiple power supply is considered when a load (e.g. a battery, an integrated circuit, or a system in the electronic device) demands a high current, voltage or power input that a single power source is incapable to provide. An electronic device receiving power from an AC adapter and a USB power source concurrently is a typical example of the multiple power supply. The "USB power source" herein refers to a power source that delivers power through a USB interface to the electronic device.

Furthermore, in order to meet the demands of the electrical requirements (e.g. voltage, current, or power requirement) from the load, a power converter is commonly employed by most of the electronic device to regulate the raw voltage, current or power delivered from the power source and to generate a stable and desirable output to the load. The power converter is usually coupled between the power sources and the load. There are two different types of power converter. One is switched mode, where the electronic device is charged through some periodically on and off switches. The other one is linear mode, where the device is charged through a variable resistor. However, a switched mode power converter with multiple power inputs is rarely seen. Usually, a linear converter is adopted in multiple power supply application.

FIG. 1 shows a prior art power supply architecture 100 using a linear power converter with multiple power inputs. As illustrated, POWER SOURCE 1, POWER SOURCE 2, . . . and POWER SOURCE N simultaneously provide power to a load or system. A linear mode power converter 102 with N power controlling devices (i.e. variable resistors) coupled to respective power sources and a common node VMAX is provided. By controlling and changing the resistance of each resistor, the total amount of power delivered to the load can be adjusted to a required value. However, the shortcoming of this solution is obvious. A large voltage difference between different power sources will result in a huge power loss and unfavorable heat producing on the power controlling device. For example, suppose a situation when a 5.0V USB power source with 500 mA current capacity and a 3.7V battery both concurrently supply the power to the load. When the load current requires less than 500 mA, only USB is needed and the load voltage is 5V. When the load current increases and requires more than 500 mA, the battery enters into operation to supply the additional current while the USB current is limited to 500 mA and the load voltage drops to 3.7V. In this case, there is a 1.3V voltage drop across the associated power controlling device connected to the USB power source and the power loss across the power controlling device is 1.3V× 500 mA=0.65 W. As a result, undesirable heat is produced. However, some of the linear mode power converters are improved with a thermal regulation technology. When the temperature over the power controlling device rises to a certain degree, the charge current is reduced. In this way, the chip is protected from over-heating. But the thermal regulation technology may cause another shortcoming, that is, the charge current becomes small.

Compared with the linear technology, a switch mode power converter works more efficiently due to the switching characteristics of switching elements (e.g. MOS transistor or diode, etc.) in the converter. But a conventional switched mode power converter is not capable of enabling multiple power supply to provide power concurrently. Generally, only one of the multiple power sources is selected to provide power to the load at one time. FIG. 2 shows another prior art power supply architecture 200 using a switch mode power converter with power selecting functionality. As illustrated, a plurality of switches SW1 201, SW2 202, . . . , and SWN 203 are provided to select one of the plurality of power sources POWER SOURCE 1, POWER SOURCE 2, . . . , and POWER SOURCE N to deliver power to a load or a system via a switched mode power converter 204. Usually, each power source is assigned a priority. The electronic device first checks the power source with the highest priority. If the power source with the highest priority is available, this power source is then selected to supply the power to the load. If the power source with the highest priority is not available, a next power source with lower priority is checked. It is known that no matter which power source is selected; only one switch is turned on or closed at a time. The reason is that if more than one switch is turned on, the associated power sources will short each other. As a result, the problem with this method is that the power sources are not fully utilized.

FIG. 3 illustrates yet another prior art power supply architecture 300 with a charger and battery to supply power to a load. As illustrated, a charger 302 (also known as an external power source) and a battery 304 are coupled together to a load. In this case, the charger, or the external power source 302, is only used to charge the battery 304 and the load gets power only directly from the battery 304. The charger 302 can receive power from one or more external power sources POWER SOURCE 1, POWER SOURCE 2, . . . , and POWER SOURCE N as illustrated in FIG. 3. The problem with this architecture is that the load voltage, current, or power is latched to the battery's voltage, current, or power. When the battery 304 is discharged below the minimum voltage required by the load, the load or the system cannot start immediately even when external power source 302 is available and have enough current capacity.

Therefore, it is to an improved and efficient power supply system that overcomes the above-mentioned shortcomings of the several types of conventional power supply systems and emulates an equivalent effect of multiple power supply to a load via a switched mode power converter that the present invention is primarily directed.

SUMMARY OF THE INVENTION

There is provided a power management device for enabling multiple power sources to provide power to a load. The power management device includes a plurality of switches and a control logic. The plurality of switches are coupled to a plurality of power sources respectively and each switch is coupled to each power source. The control logic is capable of selecting a set of switches among the plurality of switches to cooperate in a time-divided fashion to allow the power sources to provide power to the load. The set of switches is selected based on an electrical requirement of the load and an electrical condition of each switch.

There is provided a power management controller. The controller is coupled to a load and coupled to a plurality of power sources through a plurality of switches. The controller includes a pulse generator and a control logic. The pulse generator is adapted to generate a pulse controlled signal (e.g. a PWM or PFM signal) to adjust power delivered to the load. The control logic is coupled to the pulse generator. The control logic receives the pulse controlled signal and selects a set of switches among the plurality of switches to cooperate in a time-divided fashion to allow the power sources to provide power to the load. The set of switches is selected based on an electrical requirement of the load and an electrical condition of each switch.

There is provided a portable media player. The portable media player includes a media input device, a media playing device, a plurality of switches coupled to a plurality of power sources respectively, a pulse generator, a control logic, and a switched mode power converter. The media input device is used to receive media content. The media playing device is coupled to the media input device and is used for playback of the media content. The pulse generator is adapted to generate a pulse controlled signal. The control logic is coupled to the pulse generator and the plurality of switches. The control logic receives the pulse controlled signal and selects a set of switches among the plurality of switches to operate in a time-divided fashion to allow the power sources to provide power to the media playing device. The set of switches is selected based on an electrical requirement of the media playing device and an electrical condition of each switch. The switched mode power converter is coupled to the control logic and the media playing device for adjusting the power delivered to the media playing device.

There is provided a method for enabling multiple power sources to provide power to a load. The method includes selecting at least one power source among the plurality of power sources to provide power to the load based on electrical conditions of the power sources and electrical requirement of the load, allowing the at least one power sources to provide power to the load in a time-divided fashion.

BRIEF DESCRIPTION OF THE DRAWINGS

Features and advantages of embodiments of the invention will become apparent as the following Detailed Description proceeds, and upon reference to the Drawings, where like numerals depict like elements, and in which.

DETAILED DESCRIPTION OF THE INVENTION

Figure 4:
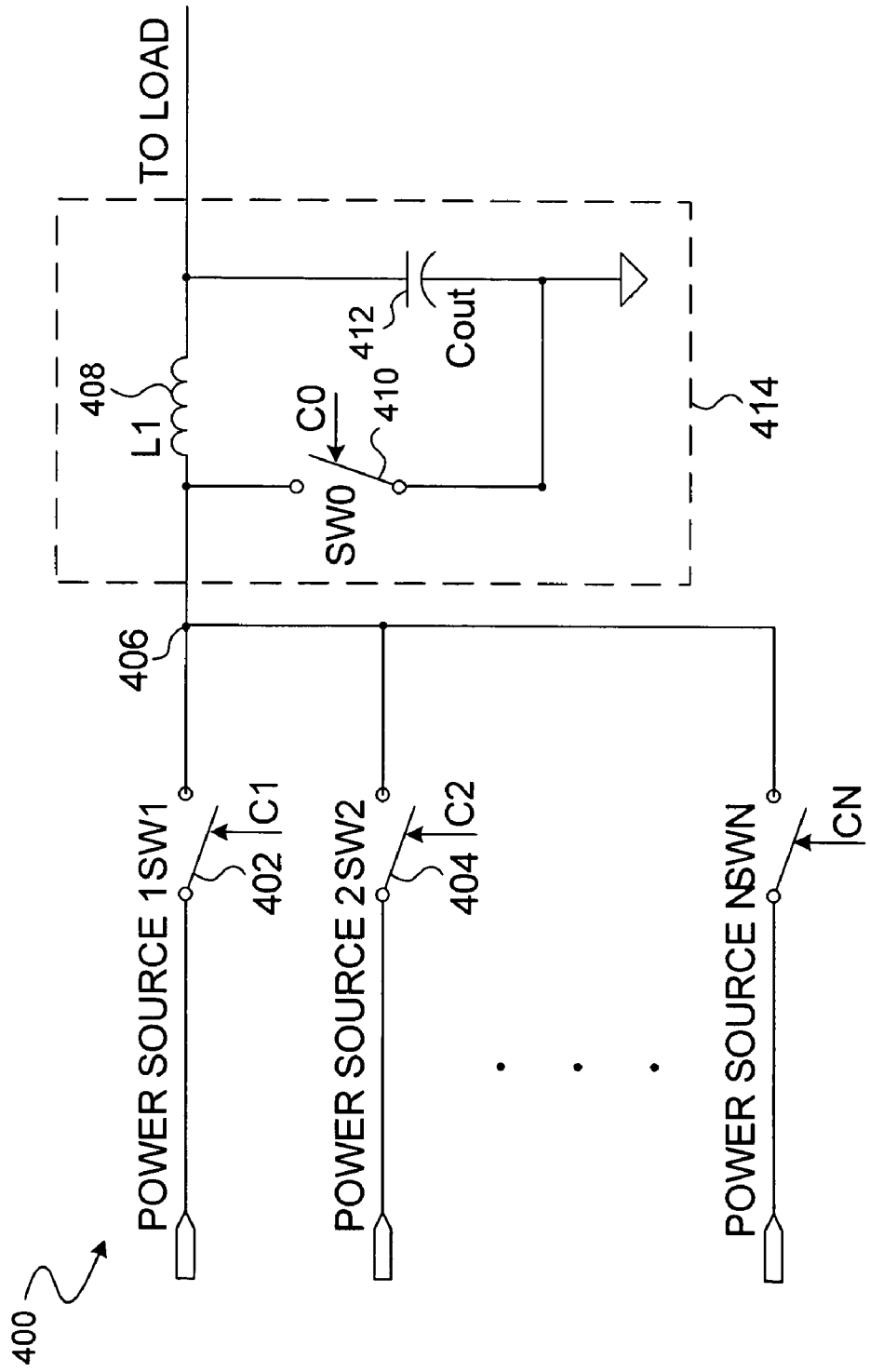
FIG. 4 illustrates an exemplary switched mode power converter with multiple inputs according to one embodiment of the present invention.

FIG. 4 illustrates an exemplary switched mode power converter 400 with multiple inputs according to one embodiment of the present invention. The improved switch mode power converter includes a plurality of switches SW1 402, SW2 404, . . . , and SWN and a circuit 414 as illustrated. It receives a plurality of power inputs from POWER SOURCE 1, POWER SOURCE 2, . . . , and POWER SOURCE N and delivers output to a load (e.g. a system). As illustrated, one terminal of SW1 402, SW2 404, . . . , and SWN is coupled to one of the power sources POWER SOURCE 1, POWER SOURCE 2, . . . , and POWER SOURCE N respectively and the other terminal is coupled to the circuit 414 via a common node 406. Each switch has two states: ON (close) and OFF (open). A plurality of control signal C1, C2, . . . , CN are applied on SW1, SW2, . . . , and SWN respectively to control the state of these switches. The circuit 414 includes an inductor 408, a switch 410 and a capacitor 412. The inductor 408 is coupled between the node 406 and the load. The switch 410 is coupled between the node 406 and a reference voltage potential, e.g. a ground potential. The capacitor 412 is coupled between the load and the reference voltage potential. It is readily recognized by those skilled in the art that circuit 414 is a portion of a DC/DC buck converter and any switch selected from the switches SW1, SW2, . . . , and SWN together with the circuit 414 make up of a basic architecture of a buck converter. For simplicity, the following detailed description will proceed with two power sources POWER SOURCE 1 and POWER SOURCE 2. It should be understood by those skilled in the art that a switched mode power supply with more than two power sources can be realized with reference to the description of the present embodiment.

It is obvious to those skilled in the art that SW1 402 and circuit 414 together operate as a conventional DC/DC buck converter. In order to output a voltage lower than the input voltage, SW1 402 and SW0 410 are alternately and mutually exclusively set to open and close via control signal C1 and C0. SW2 404 and circuit 414 operate in the same way as SW1 410 and circuit 414 do. To achieve an effect of a multiple power supply, the present invention advantageously combines the two converters in a time-divided fashion. The operation in FIG. 4 will become apparent with reference to the description of FIG. 5 and FIG. 6.

Figure 5:
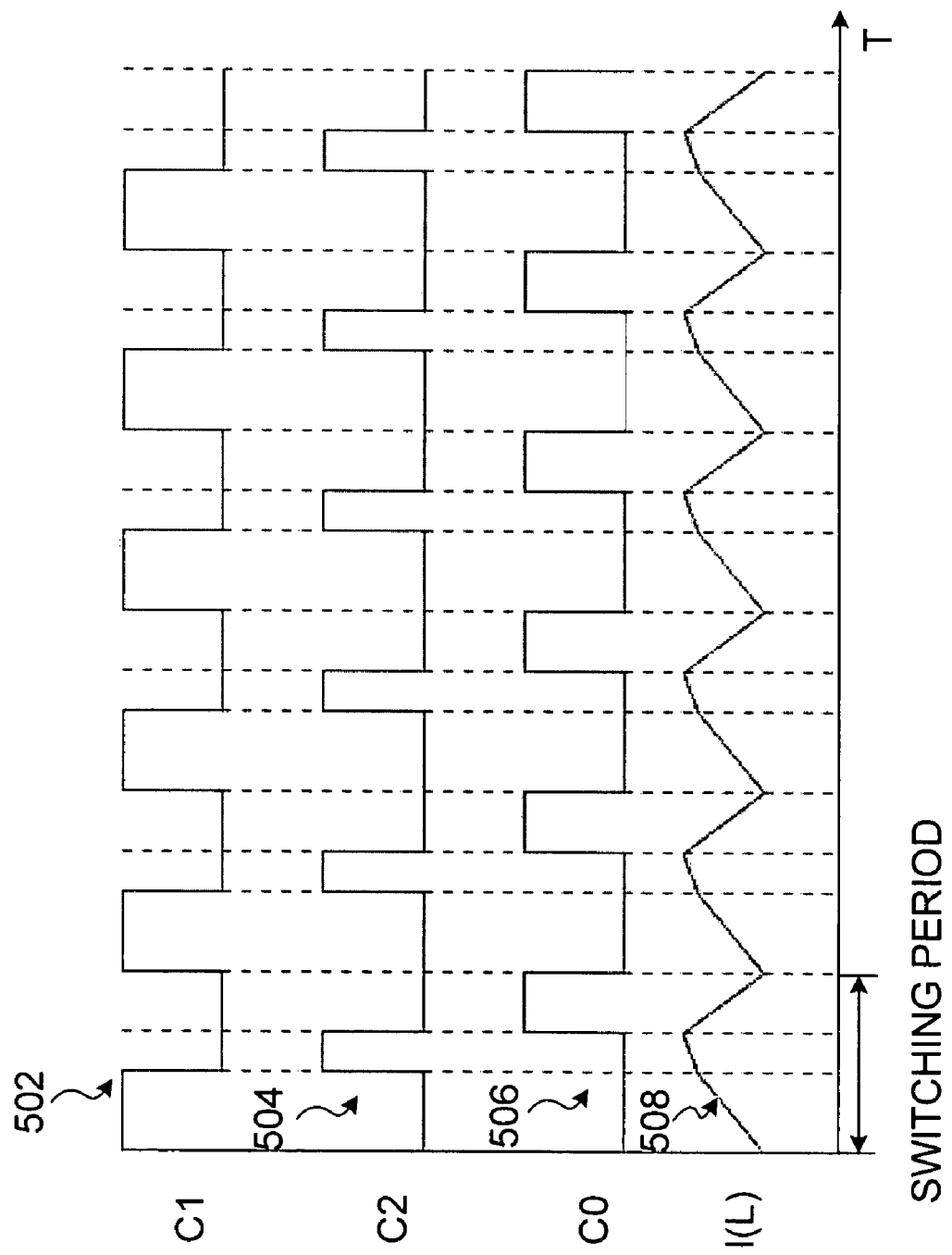
FIG. 5 illustrates a timing diagram for a power converter according to one embodiment of the present invention.

Referring to FIG. 5, a timing diagram is provided to illustrate the operation of one embodiment of the present invention. The control signal C1 502, C2 504, and C0 506 are pulse signals with a logic HIGH and a logic LOW appearing in an alternating fashion. In operation, the switch SW1 402, SW2 404 and SW0 410 in FIG. 4 are responsive to the control signal C1 502, C2 504 and C0 506 respectively and close and open periodically according to the control signals. The period for a cycle of ON and OFF of switch SW0 410 is referred to as a switching period. In a first portion of each switching period, C0 506 is in a logic LOW and the control signal C1 502 goes through a logic HIGH and a logic LOW with the control signal C2 504 having the opposite logic of C1; In a second portion of each switching period, C0 506 is in a logic HIGH and the control signal C1 502 and C2 504 are both in logic LOW.

In operation, SW1 402 and SW2 404 alternately and mutually exclusively open and close in response to the control signal C1 502 and C2 504 when SW0 410 is open in a first portion of the switching period, thereby allowing POWER SOURCE 1 and POWER SOURCE 2 to alternately provide power to the load in the first portion of the switching period in a time-divided manner. When SW0 410 is closed in a second portion of the switching period, both of SW1 402 and SW2 404 are set to open. No power is delivered from the power sources to the load during the second portion of the switching period. It can be seen that the switch 402 and switch 404 is operating in a first portion of the switching period and stops operating in a second portion of the switching period. Due to the high switching frequency of SW0 410, SW1 402 and SW2 404, POWER SOURCE 1 and POWER SOURCE 2 can be regarded as delivering the power concurrently to the load during the first portion of the switching period. Therefore, the average current delivered to the load is approximately the sum of the average current delivered from each power source to the load. Plot 508 in FIG. 5 depicts the current flowing through the inductor 408 as a result of the timing diagram of C1 502, C2 504 and C0 506. In order to generate a stable and direct current to the load, the output capacitor 412 is introduced to smooth the output current as well as the output voltage, which is easily understood by those skilled in the art.

Figure 6:
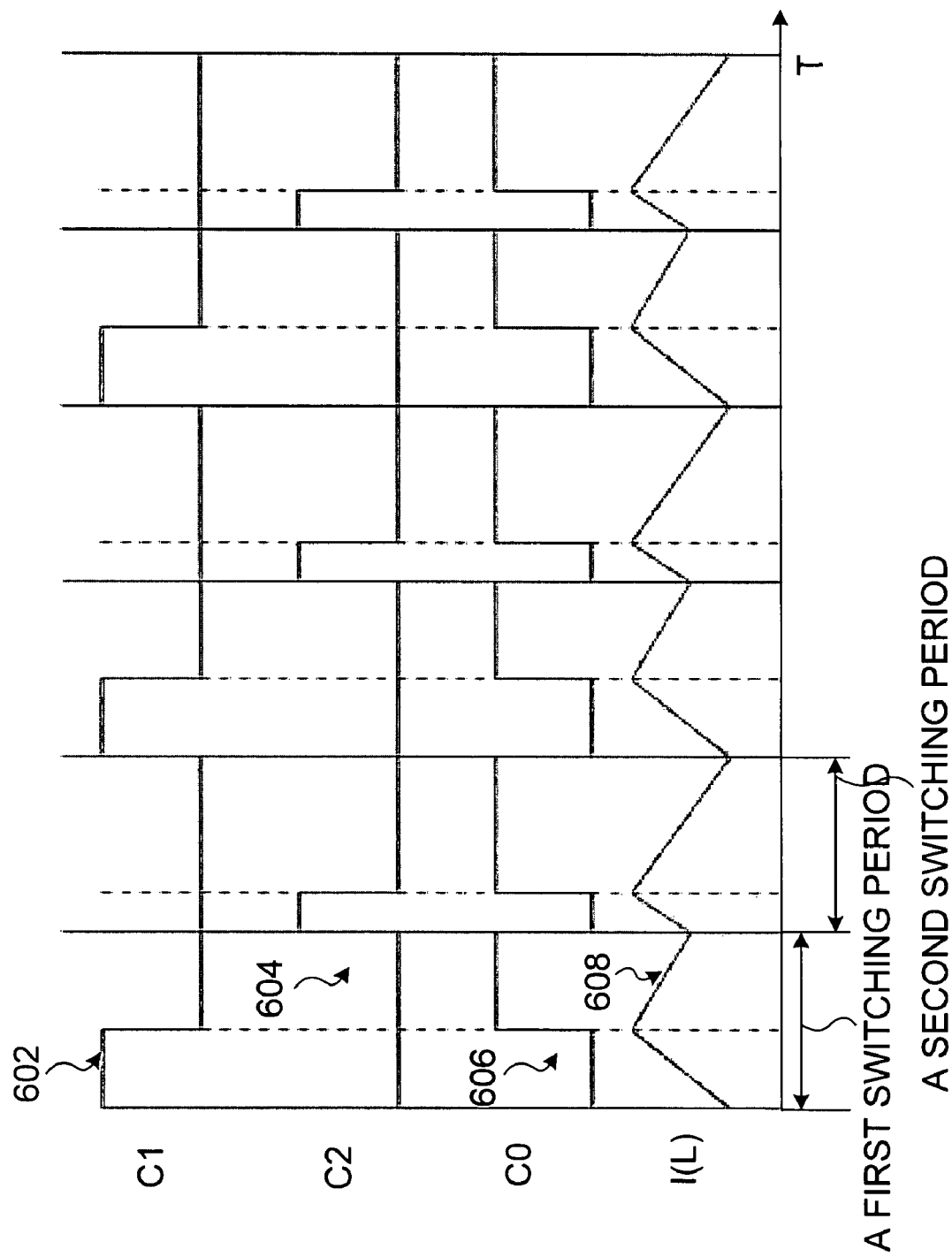
FIG. 6 illustrates a timing diagram for a power converter according to one embodiment of the present invention.

Turning to FIG. 6, an alternative timing diagram is provided to illustrate the operation of an alternative embodiment of the present invention. The control signal C1 602, C2 604, and C0 606 are pulse signals with a logic HIGH and a logic LOW appearing in an alternating fashion. In operation, the switch SW1 402, SW2 404 and SW0 410 in FIG. 4 are responsive to the control signals C1 602, C2 604 and C0 606 respectively to close and open periodically accordingly. The period for a cycle of ON and OFF of switch SW0 410 is referred to as a switching period. In a first switching period, the control signal C2 604 is in logic LOW and the control signal C1 602 goes through a logic HIGH and logic LOW with the control signal C0 606 having the opposite logic of C1. In a second switching period, the control signal C1 602 is in logic LOW and the control signal C2 604 goes through a logic HIGH and logic LOW with the control signal C0 606 having the opposite logic of C2.

In operation, in a first switching period, SW2 404 is open while SW1 402 and SW0 410 alternately and mutually exclusively open and close in response to the control signal C1 602 and C0 606, thereby allowing the POWER SOURCE 1 to deliver power to the load. In a second switching period, SW1 402 is open while SW2 404 and SW0 410 alternately and mutually exclusively open and close in response to the control signal C2 604 and C0 606, thereby allowing the POWER SOURCE 2 to deliver power to the load. On the whole, it seems that two converters operate in turns every other switching period. Due to the high switching frequency of SW0 410, SW1 402 and SW2 404, POWER SOURCE 1 and POWER SOURCE 2 can be regarded as delivering the power at the same time to the load during the switching period. Therefore, the average current delivered to the load is approximately the sum of the average current provided by each power source. Plot 608 in FIG. 6 depicts the current flowing through the inductor 408 according to the timing diagram of C1 602, C2 604 and C0 606. In order to generate a stable and direct current to the load, the output capacitor 412 is introduced to smooth the output current as well as the output voltage, which is easily understood by those skilled in the art.

The above described time-divided method allows the selected power sources to provide power alternately at a high switching frequency, which gives an effect that multiple power sources are supplying the power to the load at the same time. Consequently, the power sources are fully and efficiently utilized due to this time-divided characteristic. It should be noted that FIG. 5 and FIG. 6 are only two exemplary timing diagrams for the switch control signals according to the present invention. Alternative timing diagrams embodying this time-divided technique to emulate an equivalent effect of multiple power supply may also be considered as within the spirit of the present invention.

Furthermore, SW1, SW2, ..., and SWN introduced in FIG. 4 have dual functions. These switches are not only configured to selectively allow corresponding power sources to provide power to the load; but they are also part of a conventional switched mode power converter, serving as one of a plurality of switching elements which are essential components in the switched mode power converter. Due to the dual-function feature of the switches, the hardware complexity is reduced, which advantageously offers a cost benefit.

Figure 1:
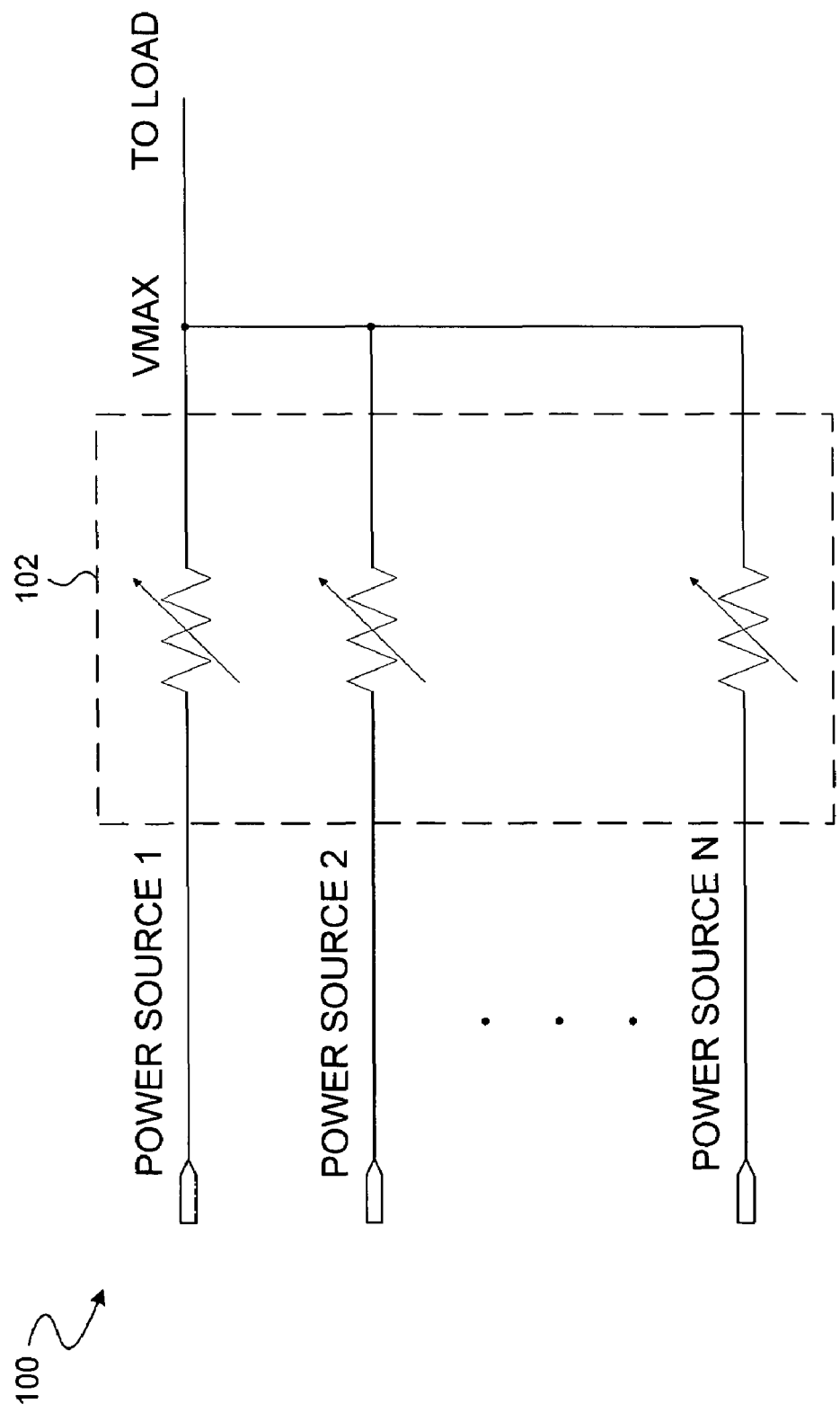
FIG. 1 illustrates a prior art power supply architecture using linear power converter with multiple power input.
Figure 2:
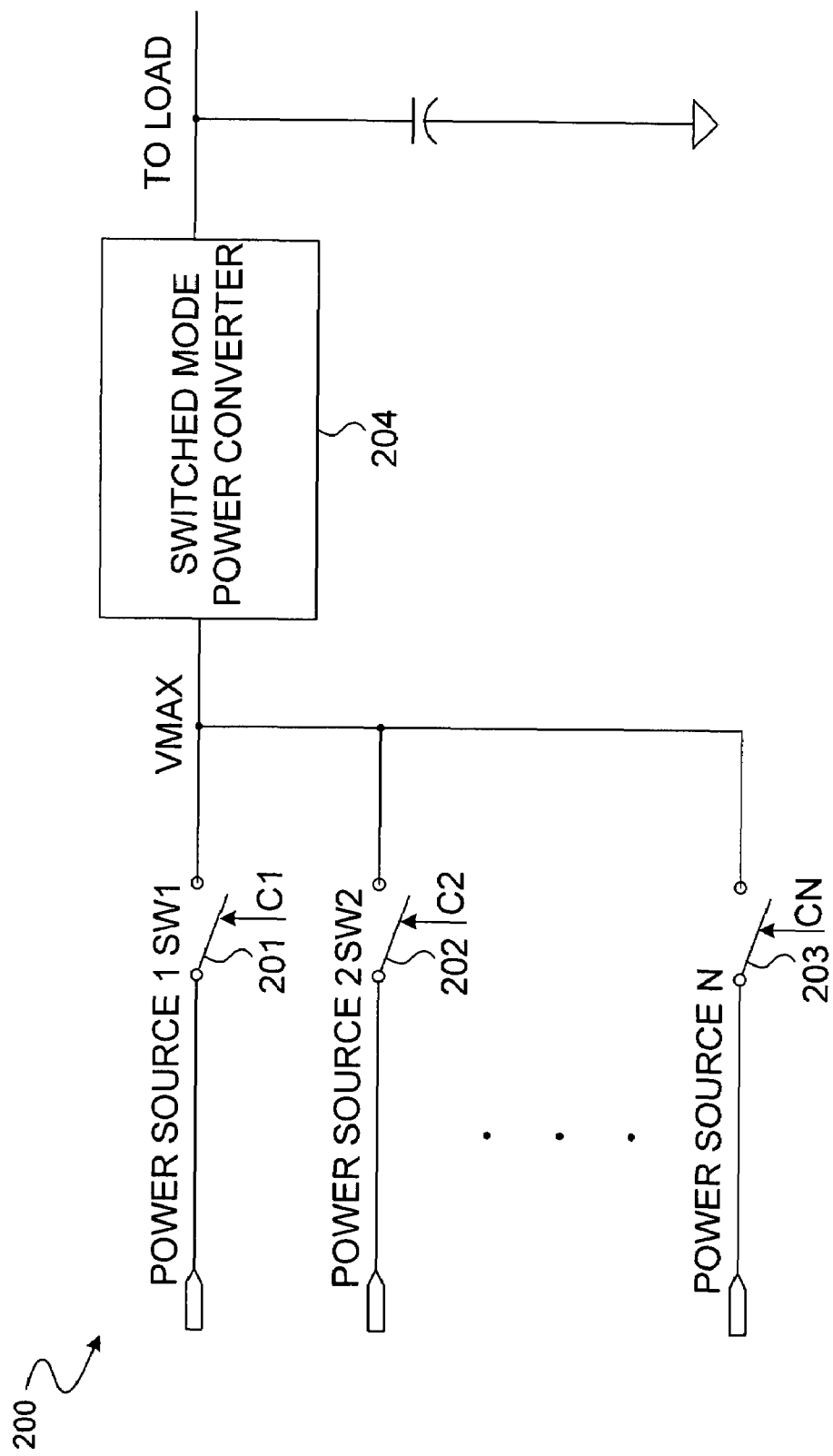
FIG. 2 illustrates another prior art power supply architecture using switch mode power converter with power selecting functionality.
Figure 3:
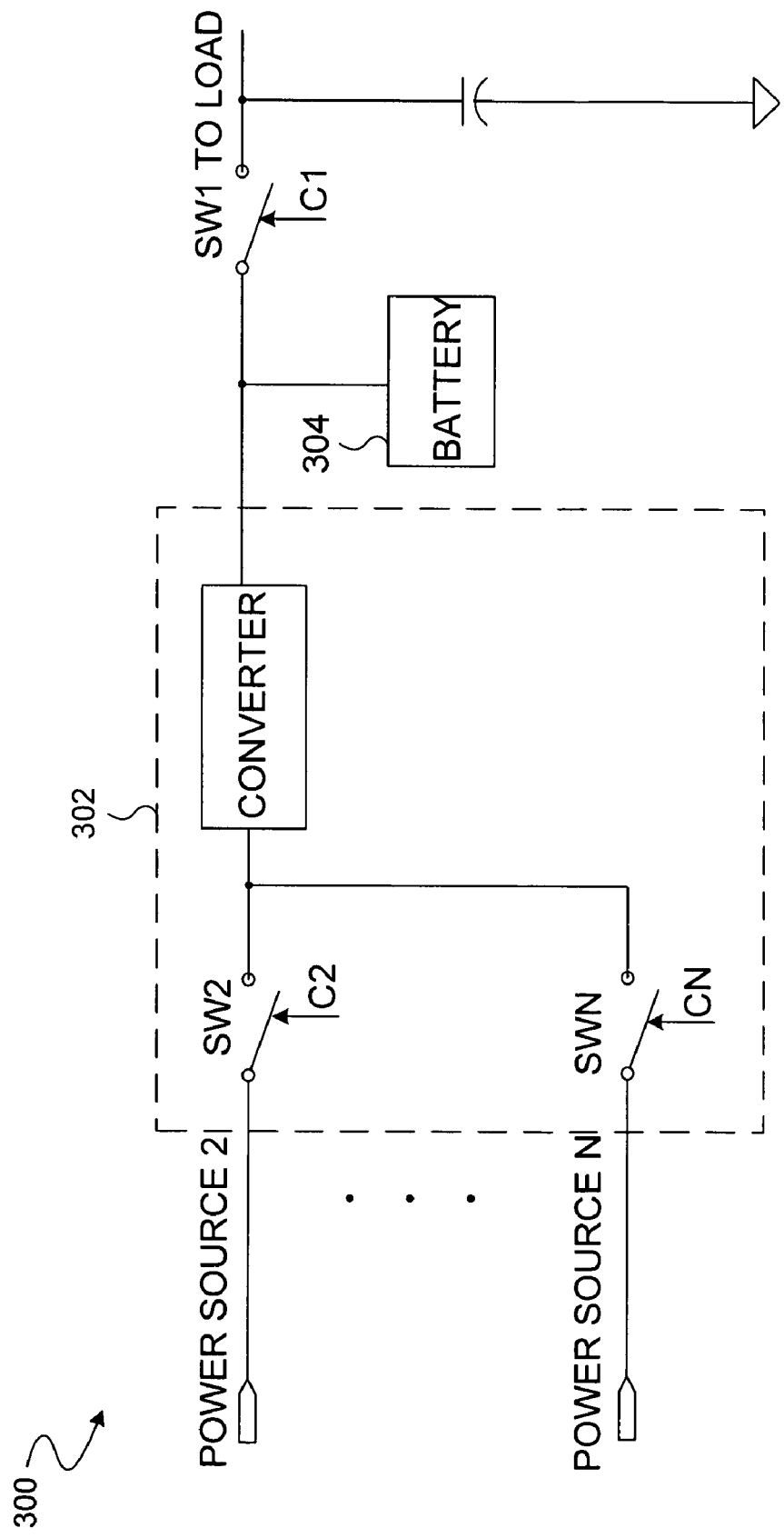
FIG. 3 illustrates yet another prior art power supply architecture using a battery to supply power to a load.

It should be noted that some modifications without departing from the spirit of the present invention might also be made to the embodiments with regard to FIG. 4, FIG. 5 and FIG. 6. For example, by employing the time-division technique, an equivalent effect of multiple power supply can also be realized in FIG. 2. In this case, SW1, SW2, ..., and SWN may not be part of a power converter, instead, they are externally coupled to the power converter and the corresponding power sources. Furthermore, the switched mode power converter might not be limited to a DC/DC buck converter, alternative switched mode power converters may include a boost converter, buck-boost converter, a DC/AC converter, etc. When these external switches SW1, SW2, ..., and SWN cooperate with the associated internal switching elements of the power converter according to the timing diagram of FIG. 5 and FIG. 6 or other alternative timing diagrams, the equivalent effect of multiple power supply can also be achieved.

Figure 7:
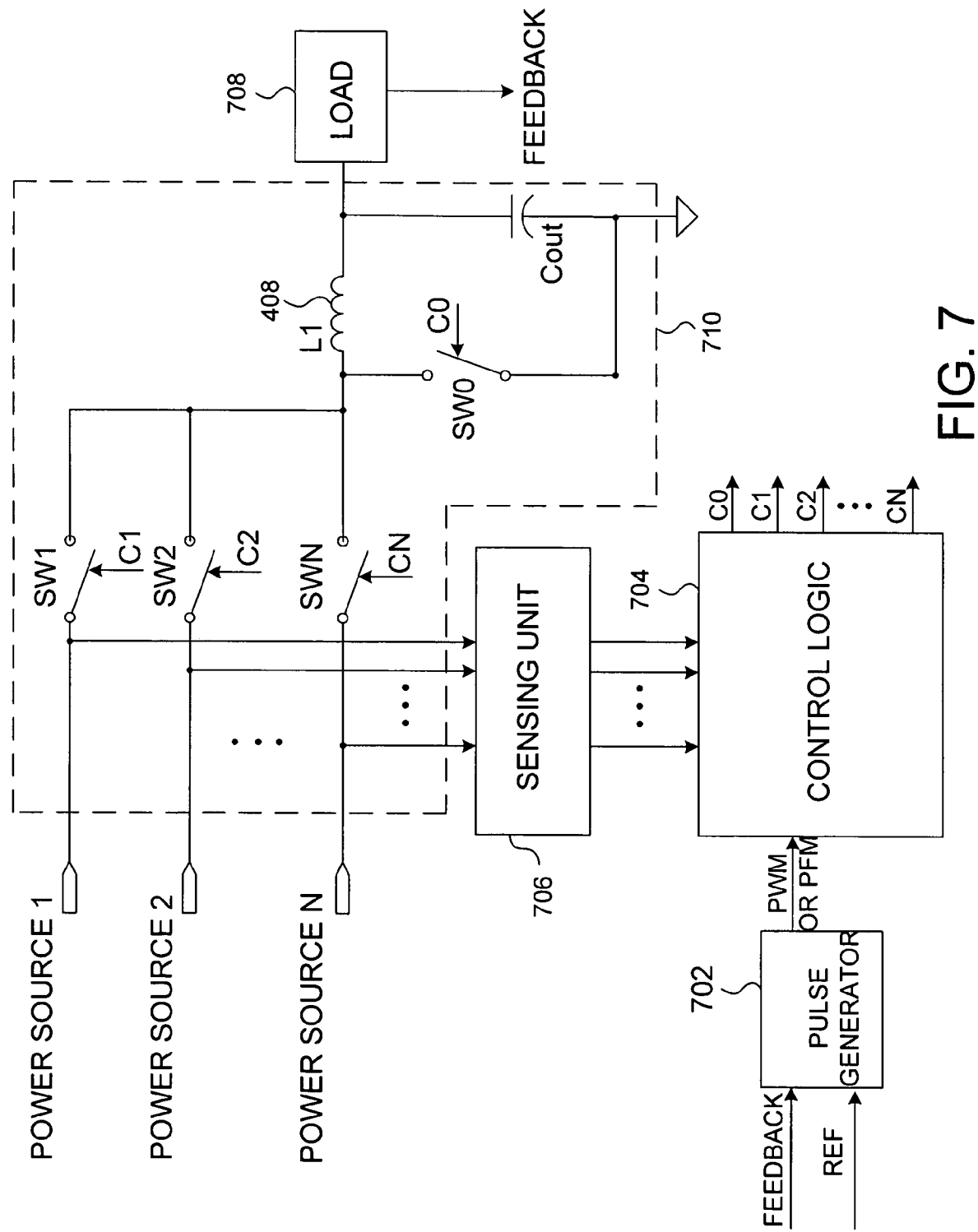
FIG. 7 illustrates a power management system according to one embodiment of the present invention.

FIG. 7 illustrates a power management system according to one embodiment of the present invention. The power management system includes a switch mode power converter 710 with multiple power inputs POWER SOURCE 1, POWER SOURCE 2, ..., and POWER SOURCE N, a control logic 704, a pulse generator 702, an optional sensing unit 706. For simplicity, the multiple power input converter 710 can be the same converter 400 as illustrated in FIG. 4. However, it should be noted that the converter 710 can be in a variety of forms as long as it is implemented according to the above description.

The pulse generator 702 is capable of generating a pulse width modulated (PWM) signal to a control logic 704. The pulse width (or duty cycle) of the PWM signal is used to control the amount of power delivered from one or more of power sources POWER SOURCE 1, POWER SOURCE 2, ..., and POWER SOURCE N to a load 708. It should be noted that a pulse frequency modulated (PFM) signal or alternative signals that carry the power control information might also be generated by the pulse generator 702 for controlling the amount of power delivered to the load 708. The following description is based on one embodiment of the present invention using PWM signal. The pulse generator 702 receives a feedback from the load 708 and a reference signal generated internally by the pulse generator 702. The feedback is representative of an electrical condition of the load 708, such as a voltage across the load 708, and/or a current through the load 708, and/or power over the load 708. When the feedback signal is above or below the reference signal, the PWM generator 702 regulates the duty cycle of the PWM signal, thereby adjusting the output of the converter 710 to the load 708.

The control logic 704 receives the PWM signal from the pulse generator 702 and a plurality of sensed signals indicating electrical conditions of a plurality of switches SW1, SW2, ..., and SWN coupled to a plurality of power sources POWER SOURCE 1, POWER SOURCE 2, ..., and POWER SOURCE N respectively. The sensed signals are outputs from a sensing unit 706, which will be discussed below. Based on an electrical requirement of the load 708, the level of sensed signals, and the PWM signal, the control logic 704 generates a plurality of control signals C0, C1, C2, . . . , and CN. The control signals select associated switches among SW0, SW1, SW2, . . . , and SWN and control the ON and OFF state of the associated switches to operate in an alternating fashion to emulate an equivalent effect of multiple power supply.

The sensed signals are the outputs from a sensing unit 706. The sensing unit 706 detects the electrical conditions of the plurality of switches SW1, SW2, . . . , and SWN. The electrical condition can be a current through a switch, a voltage across a switch, or a power over a switch. In one embodiment, the sensing unit 706 may detect the current flowing through each switch by employing a current mirror coupled to each switch. In an alternative embodiment, the sensing unit 706 may detect the current passing through each switch by measuring the current through inductor 408. It is understood that, although the present invention realizes an effect equivalent to multiple power supply, there is still one power source providing the power at one time. Therefore, the current through inductor 408 represents a current flowing through one switch at any time and the currents flowing through different switches can be detected by sensing the current flowing through the inductor 408 at different time section. It is readily appreciated by those skilled in the art that the techniques of sensing the electrical condition of each switch should not be limited to the above mentioned approaches. Alternative sensing techniques that are already known to those skilled in the art or later-developed sensing techniques should also be considered as different embodiments of the present invention.

Figure 8:
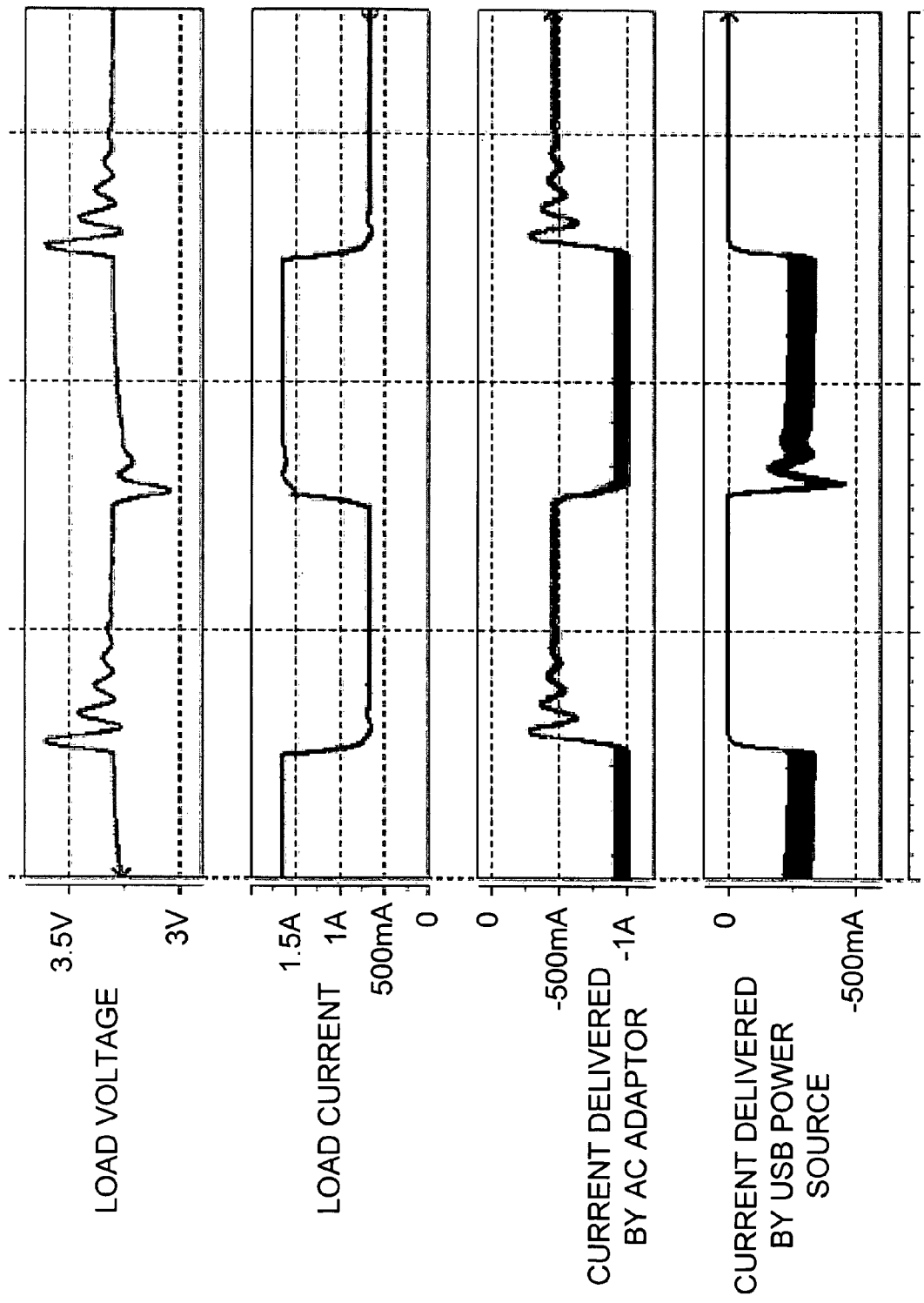
FIG. 8 illustrates waveforms of the load voltage, load current, AC adaptor current and USB current.

In operation, in one embodiment, suppose there are two power sources: an AC adaptor, and a USB power source. The AC adaptor is coupled to SW1 and USB power source is coupled to SW2. The voltage provided by the AC adaptor is 5V and the current capacity (also known as electrical limitation) of the AC adaptor is 1 A. The voltage provided by the USB power source is 4.5V and the current capacity of the USB power source is 0.5 A (also known as electrical limitation). The voltage requirement from the load 708 is 3.3V. FIG. 8 illustrates waveforms of the load voltage, load current, AC adaptor current and USB current. The following description refers to FIG. 8. As illustrated in FIG. 8, when the load 708 requires a low current (e.g. 0.6 A), only AC adaptor is selected by the control logic 704 to provide current to the load 708. In this case, the converter 710 is a conventional buck converter with a single power input. When the load 708 requires a high current (e.g. 1.7 A), then both AC adaptor and USB power source are selected to provide current to the load 708 with 1 A from the AC adaptor and 0.25 A from the USB power source. It is noted that a buck converter usually outputs a higher current than the input current. Therefore, the sum of total current provided by the AC adaptor and the USB power source is lower than the output current 1.7 A (i.e. the current required by the load). In this case, the state of SW1, SW2, and SW0 are controlled by the control logic 704 in a way consistent with the timing diagrams illustrated in FIG. 5 and FIG. 6 or any equivalent timing diagrams.

Usually, each power source is assigned a priority. In the above example, suppose the AC adaptor has a higher priority than the USB power source, the control logic 704 will first check the availability of the AC adaptor. In the case of a 1.7 A current requirement of the load 708, the control logic 704 first selects the AC adaptor to provide current to the load if the AC adaptor is available. When the average current flowing through the switch SW1 exceeds a predetermined current limit (e.g. 1 A) during the switching period as previously mentioned in the description of FIG. 5 and FIG. 6, the control logic turns off the switch SW1 and turns on the switch SW2 to provide the additional current to the load 708. In this way, the duty cycle of C1 and C2 in FIG. 5 or FIG. 6 are determined. It should be noted that the "average current" herein refers to the current averaged in the switching period which includes both an ON and OFF period of the switch.

In yet another embodiment, the sensing unit 706 may be omitted from FIG. 7. By knowing the electrical requirement of the load 708, the electrical limitation of each switch SW1, SW2, . . . , and SWN, or the ratio of each electrical limitation among switches SW1, SW2, . . . , and SWN, the PWM generator 702 might be able to generate a PWM signal that reflects the duty cycle of C1, C2, . . . , and CN.

Figure 9:
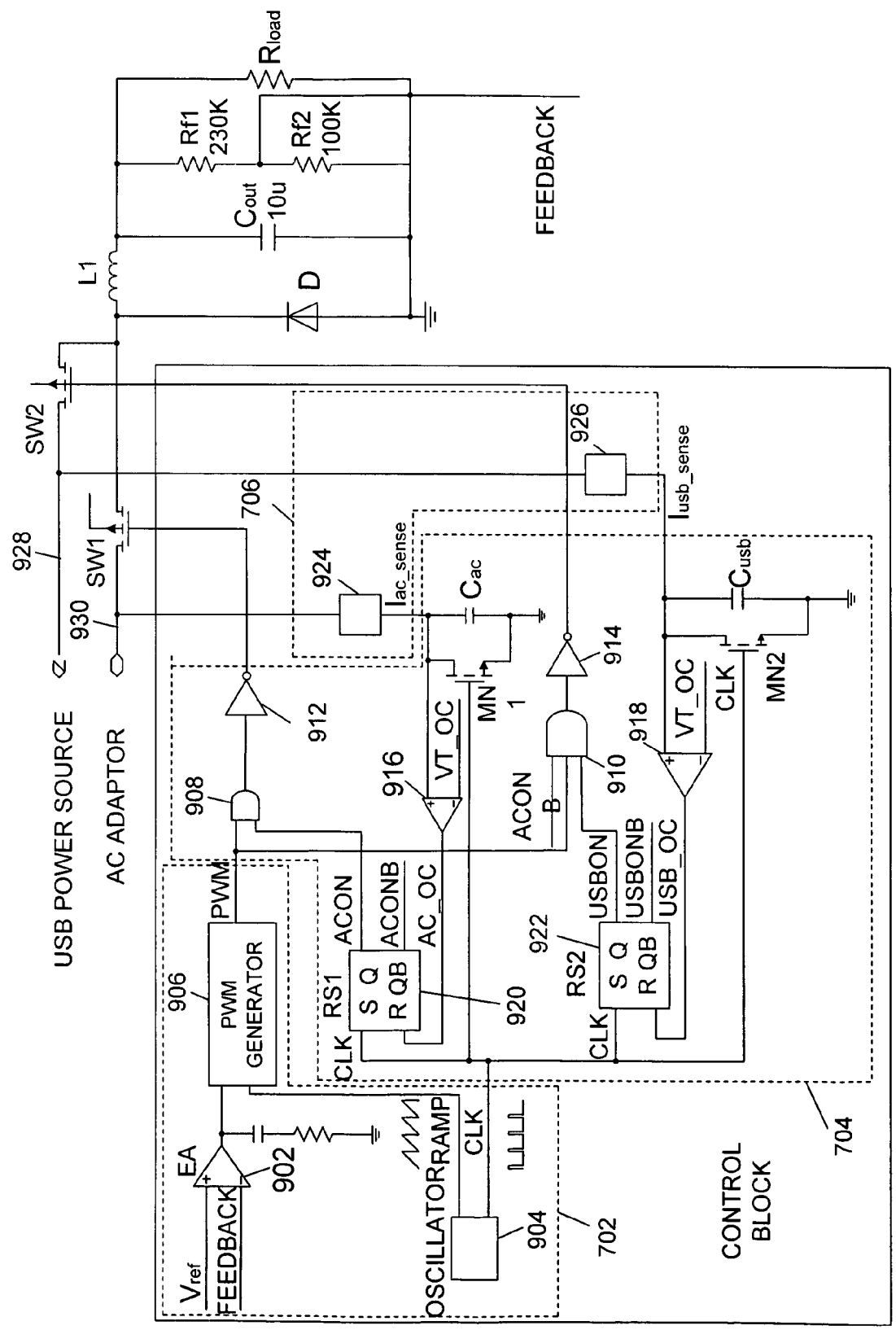
FIG. 9 illustrates a detailed schematic according to one embodiment of the present invention.

FIG. 9 illustrates a detailed schematic of FIG. 7 according to one embodiment of the present invention. The sensing unit 706 includes a first current sensing unit 924 and a second current sensing unit 926. Take the operation of the first current sensing unit 924 for example, a current mirror (not shown) in the unit 924 is used to sense a current Iac_sense that is proportional to the current flowing through SW1. Likewise, a current Iusb_sense related to the current flowing through SW2 may be sensed in the same manner. Iac_sense and Iusb_sense are two sensed currents indicating the electrical conditions of SW1 and SW2 respectively.

The pulse generator 702 includes an error amplifier 902, a PWM GENERATOR 906 and an OSCILLATOR 904. An error amplifier 902 receives a feedback signal from the load and a reference signal generated internally, and amplifies the error between the feedback signal and the internal reference signal. The OSCILLATOR 904 generates two signals: a clock signal and a ramp signal. The frequency of the PWM signal clock signal is the same as the clock frequency. The ramp signal is a sawtooth signal generated from the clock signal. The PWM_GENERATOR 906 receives the ramp signal and the output of the error amplifier 902 and generates a PWM signal with only logic HIGH and logic LOW. The duty cycle of the PWM signal is related to the output of the error amplifier 902. Accordingly, the variation of the voltage, current or power of the load may result in a corresponding adjustment of the duty cycle of the PWM signal, which, in turn, regulates the voltage, current or power of the load to a desired value.

The control logic 704 includes a series of logic and control circuits. The sensed currents Iac_sense and Iusb_sense are inputs of the control logic 704. Iac_sense charges a capacitor Cac comprised in the control logic 704. The voltage on the capacitor Cac is reset to 0V at the beginning of each clock cycle, wherein the clock signal is generated by the OSCILLATOR 904. A comparator 916 compares the voltage across the capacitor Cac with a predetermined threshold VT_OC. When the voltage across the capacitor Cac reaches the predetermined threshold VT_OC, a signal AC_OC is asserted by the comparator 916 to turn off the switch SW1. In each clock cycle, the capacitor Cac is charged by Iac_sense and discharged by a transistor MN1. Thus, the amount of charge transmitted in each clock cycle is limited and the average current provided by AC adaptor can be limited to the electrical limitation of AC adaptor. Likewise, the capacitor Cusb is charged and discharged through the same process and the average current provided by the USB power source is also limited to the electrical limitation of USB power source.

Of course, the current flowing through SW1 or SW2 should also be within a maximum allowable current range of SW1 or SW2. Therefore, the electrical conditions sensed from switch SW1 and SW2 should be restrained to the electrical limitation along path 928 and path 930 indicating the electrical limitation from both the power source and the corresponding switch, as illustrated in FIG. 9.

If the signal AC_OC is not asserted, i.e., the average current of AC adaptor during the clock cycle is within the limit, a driver 912 used to drive the switch SW1 is enabled through a logic block AND 908. When the average current of the AC adaptor during the clock cycle exceeds the limit, the signal AC_OC is asserted. Thereby, the driver 912 is disabled and SW1 is turned off. Then, a driver 914 used to drive the switch SW2 is enabled through a logic block AND 910 until the average current of the USB power source during the clock cycle exceeds the limit or at the end of duty cycle. When the next clock cycle comes, the Cac and Cusb are first discharged to 0V and the signal AC_OC and USB_OC are disserted. SW1 is first enabled at the beginning of each clock cycle because of a higher priority.

As previously mentioned, the sensing unit 706 can be omitted. In this case, the pulse generator 702 is capable of generating a PWM signal whose duty cycle is proportional to the ratio of the electrical limitation along each path (i.e. path 928, 930) connecting between the input power source and its respective switch. Consequently, the clock signal is no longer needed to discharge the Cac and Cusb to 0V.

The present invention is applicable to any electronic device having a switched mode power converter for power regulation and having multiple interfaces for multiple power source connections. More specifically, the device can be a portable electronic device including a portable media player, portable media center, a MP4 player, a personal digital assistant, a digital camera, or a cell phone only to name few. The invention made it possible for the electronic device to receive power through multiple power sources concurrently, where these power sources are coupled to the same switched mode power converter. When a load, such as a system, a chip, a circuit or a component (e.g. CPU, light indicator, display unit, battery, etc) in the electronic device requires a certain amount of power input, current input, or voltage input, the switched mode power converter is capable of selecting the appropriate power sources to provide power, current, or voltage to the load and capable of controlling the amount of power, current, or voltage delivered by each power source.

For example, a portable media player (PMP) basically comprises a media input device for receiving and storing media content, a processor for processing the media content, a media playing device for playback of the processed media content, and a power supply system. In some type of PMP power supply system, the processor, the display unit, and/or the media storage device are powered by battery. The battery is charged through external power sources. In this case, the present invention can be used to provide power to the battery. The load that the present invention mentioned previously can be the battery, while the multiple power sources that the present invention mentioned previously can be the external power sources, such as USB power source, AC adaptor. In some other type of PMP power supply system, the processor, the media playing device, and/or the media input device are powered by either battery or other power sources such as USB power source, AC adaptor. In this case, the present invention can be used to provide power to the processor, and/or the media playing device, and/or the media input device, The load that the present invention mentioned previously can be the processor, and/or the media playing device, and/or the media input device, while the multiple power sources that the present invention mentioned previously can be the battery and other power sources (e.g. AC adaptor, USB power source).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A power management device for enabling multiple power sources to supply power to a load, comprising:
    a buck converter having an input and an output, the output being connected to the load;
    a plurality of switches, each switching have a first end and a second end, the first end of each switch being connected to the input of the buck converter, the second end of each switch being coupled to one single power source through a path;
    a sensing unit for sensing electrical conditions of each switch;
    a control logic, the control logic receiving the electronic conditions from the sensing unit, the control logic being capable of selecting a subset of switches among the plurality of switches to cooperate in a time-divided fashion to allow the power sources associated with a selected subset of switches to provide power to the load, the subset of switches being selected based on feedback information received from the load and an electrical condition received from the path associated with each power source; and
    a pulse generator coupled between the load and the control logic, the pulse generator receiving the feedback information from the load and generating a pulse signal to the control logic.

2. The device of claim 1, wherein the buck converter is a switched mode power converter coupled between the plurality of switches and the load.

3. The device of claim 1, wherein the buck converter is a switched mode power converter coupled between the plurality of power sources and the load, the switched mode power converter having a switching element, the switching element having a switch frequency.

4. The device of claim 3, wherein, in each switching period of the switching element, when the switching element is open, the selected subset of switches start operating by being set to open and close mutually exclusively; when the switching element is close, the selected subset of switches stop operating.

5. The device of claim 3, wherein, in each switching period of the switching element, the switching element cooperates with a different switch from the selected subset of switches to open and close mutually exclusively.

6. The device of claim 3, wherein each switch in the selected subset of switches operates periodically, and when the selected subset of switches is in operation, each switch in the selected subset of switches opens and closes alternately at a frequency, the frequency being at least the switching frequency of the switching element.

7. The device of claim 1, wherein the control logic being responsive to the electrical conditions, when one of the electrical conditions exceeds a predetermined electrical limitation along the path coupled between a corresponding power source and a corresponding switch, the control logic opens the corresponding switch and selectively close one of the remaining switches.

8. The device of claim 7, wherein the predetermined electrical limitation along the path comprises an electrical limitation of the power source coupled to the path and an electrical limitation of the switch coupled to the path.

9. A power management controller coupled to a load and coupled to a plurality of power sources through a plurality of switches, comprising:
- a sensing unit for sensing electrical conditions of each switch;
- a pulse generator for generating a pulse controlled signal; and
- a control logic receiving the electronic conditions from the sensing unit, the control logic being coupled to the pulse generator for receiving the pulse controlled signal and selecting a subset of switches among the plurality of switches to cooperate in a time-divided fashion to allow power sources associated with a selected subset of switches to provide power to the load, the subset of switches being selected based on feedback information received from the load and an electrical condition received from the path associated with each power source,
- wherein the pulse generator coupled between the load and the control logic, the pulse generator receiving the feedback information front the load.

10. The controller of claim 9, wherein the pulse controlled signal is generated based at least in part on predetermined electrical limitations of the subset of switches and electrical requirement of the load, and wherein the pulse controlled signal is by capable of adjusting the power provided power sources associated to the selected subset of switches to the load.

11. The controller of claim 9, wherein the controller is coupled to the buck converter, wherein the buck converter being a switched mode power converter having a switching element, and wherein the switching element having a switching frequency.

12. The controller of claim 11, wherein, in each switching period of the switching element, when the switching element is open, each switch in the selected subset of switches starts operating by being set to open and close mutually exclusively by the control logic; when the switching element is close, the selected subset of switches are set to stop operating by the control logic.

13. The controller of claim 11, wherein, in each switching period of the switching element, the controller enables the switching element to cooperate with a different switch from the selected subset of switches to open and close mutually exclusively.

14. The controller of claim 11, wherein the control logic enables each switch in the selected subset of switches to operate periodically, and when the selected subset of switches is in operation, each switch in the selected subset of switches opens and closes alternately qt a frequency, the frequency being at least the switching frequency of the switching element.

15. The controller of claim 9, wherein the control logic being responsive to the electrical conditions, when one of the electrical conditions exceeds a predetermined electrical limitation along a path coupled between a corresponding power source an a corresponding switch, the control logic opens the corresponding switch and selectively close one of the remaining switches.

16. The controller of claim 15, wherein the predetermined electrical limitation along the path comprises an electrical limitation of the power source coupled to the path and an electrical limitation of the switch coupled to the path.

17. A method of enabling a plurality of power sources to supply power to a load, comprising:
- sensing electrical conditions of each of a plurality of switches;
- selecting a subset of power sources among the plurality of power sources to provide power to the load based on the electrical conditions received from the path associated with each power source and feedback information received from the load; and
- allowing a selected subset of power sources to provide power to the load in a time-divided fashion, each power source having a power-on frequency.

18. The method of claim 17, the method further comprising:
- relating the power-on frequency of each power source to a switching frequency of a switched mode power converter coupled to the plurality of power sources and the load.

19. The method of claim 17, further comprising:
- determining if the electrical condition of each power source exceeds a predetermined electrical limitation of the corresponding power source; and
- turning off the corresponding power source and selectively turning on one of the remaining power sources.

* * * * *